Figure 1:
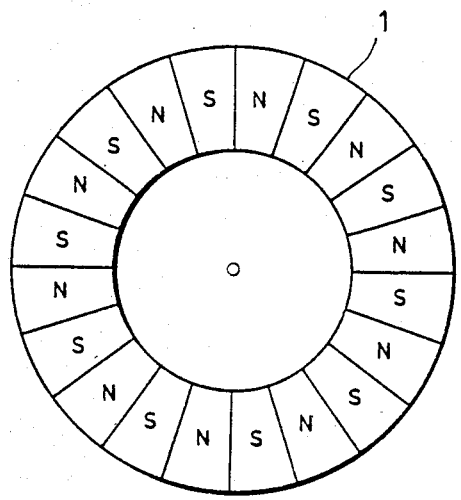

United States Patent [19]

Heyraud

[11] Patent Number: 4,634,912

[45] Date of Patent: Jan. 6, 1987

[54] ELECTROMECHANICAL TRANSDUCER HAVING A SELF-INDUCTANCE CANCELLING COIL ASSEMBLY

[75] Inventor: Marc A. Heyraud, La Chaux-de-Fonds, Switzerland

[73] Assignee: Asgalium S.A., Switzerland

[21] Appl. No.: 760,813

[22] Filed: Jul. 31, 1985

[30] Foreign Application Priority Data

Aug. 10, 1984 [CH] Switzerland ............ 3852/84

[51] Int. Cl.[4] ............ H02K 3/28; H02K 11/00; H02K 16/04
[52] U.S. Cl. ............ 310/268; 310/198; 310/208
[58] Field of Search ............ 310/49 R, 71, 156, 162, 310/198–208, 183, 186, 196, 268

[56] References Cited

U.S. PATENT DOCUMENTS

| | | | |
|---|---|---|---|
| 3,319,101 | 5/1967 | Bidard | 310/268 |
| 3,505,544 | 4/1970 | Helms | 310/14 |
| 4,072,881 | 2/1978 | Ban | 310/268 |
| 4,366,405 | 12/1982 | Schmider | 310/268 |

FOREIGN PATENT DOCUMENTS 2112708 9/1972 Fed. Rep. of Germany .
58-12567 1/1983 Japan ............ 310/268

*Primary Examiner*—Patrick R. Salce
*Assistant Examiner*—D. L. Rebsch
*Attorney, Agent, or Firm*—Parkhurst & Oliff

[57] ABSTRACT

An electromechanical transducer comprises a fixed part and a part rotatable about an axis. One of these parts includes an assembly of aircore coils which are distributed about the axis. Each coil is divided into two parts, each of which comprises two active coil segments intersected by the magnetic field upon rotation of the transducer. The two parts of each coil are furthermore arranged so that the effects of mutual inductance of the active coil segments of one coil part upon the other are reversed relative to the effects of self-inductance in each part.

12 Claims, 10 Drawing Figures

ELECTROMECHANICAL TRANSDUCER HAVING A SELF-INDUCTANCE CANCELLING COIL ASSEMBLY

This invention relates to transducers, and more particularly to an electromechanical transducer of the type having a fixed part and a part rotatable about an axis which forms the axis of the transducer.

The development of electronic systems for the acquisition, transmission, and processing of data are known to have brought about great diversification and numerous improvements in the art of electromechanical transducers during the past twenty years or so. Such transducers can be used as motors to convert electrical energy into mechanical energy or as generators. In the latter case, they convert mechanical energy into electrical energy and most often operate as sensors.

In the majority of cases, the windings of such transducers carry current pulses of generally rectangular shape, so that in the prior art designs, transient states appear at the beginning and end of the pulses. This is because, as a result of the self-inductance of the coils when a rectangular-shaped pulse is transmitted, the current does not instantly reach a value in the coil corresponding to the ratio between voltage and resistance; and it was noticed that, in certain cases, especially when the pulses were of very short duration and it was desirable for them to be able to follow one another at a high frequency, it was advantageous to aim at reducing the effects of the inductance.

Thus, the inductance is the main cause of wear on the commutators and brushes in DC motors. In the case of stepping motors, it constitutes a limit to the dynamic performance of these motors, and the feed of the coils must be "advanced" relative to the actual angular position of the rotor, or a so-called "constant current" high-tension power supply must be used, which complicates and increases the cost of the control electronics.

The need for bringing about a rapid increase of current in windings in relative movement with respect to a magnetic field or fields has already become evident in the case of linear motors; and with a view to reducing the inductance, windings in which the current passes through adjacent turns in reverse direction have been proposed (U.S. Pat. No. 3,505,544, German Pat. No. 2,112,708).

However, the design of rotary electromechanical transducers is subject to requirements different from those encountered in linear motors.

It is an object of this invention to provide an improved electromechanical rotary transducer having better efficiency and torque-winding ratio, especially of such transducers using air-core coils, by means of an arrangement of the windings which limits the inductance while retaining the simplicity and reliability of the design.

A particular object of this invention is to provide an electromechanical transducer having a rotary movable part of improved design by means of a coil arrangement making it possible to reduce the magnitude of transient phenomena at the moment when the pulses appear.

To this end, in the transducer according to the present invention, of the type initially mentioned, one of the parts includes at least one magnet and the other a coil assembly, the coils are distributed about the axis and comprise active segments of the windings intersected by the magnetic field of the magnet or magnets and connecting segments of the windings which are not intersected by the magnetic field, each coil is divided into two parts, each coil part comprises two active winding segments co-operating with the magnetic field, and the two parts of each coil are arranged in such a way that upon a variation of the current in the coil, the effects of the mutual inductance in the two parts of the coil are reversed relative to the effects of the self-inductance of each part.

It is known that, generally speaking, electromechanical transducers can be divided into three different types: variable-reluctance transducers, electrodynamic-type transducers, and electromagnetic-type transducers. As will be seen below, the improvement defined above is particularly effective in the case of the electrodynamic- and electromagnetic-type transducers; for with this kind of motors, the apparent inductance of the winding does not play any direct part in the creation of the torque as long as the interaction between the coil and the magnet is preserved.

Figure 4:
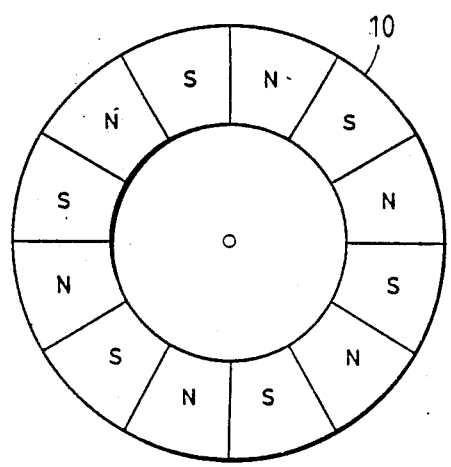
Figure 2:
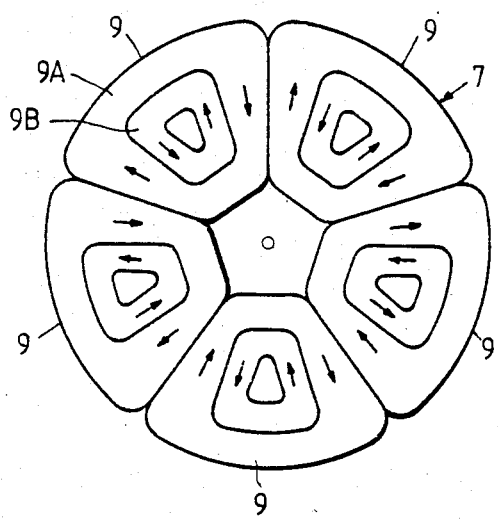
Figure 5:
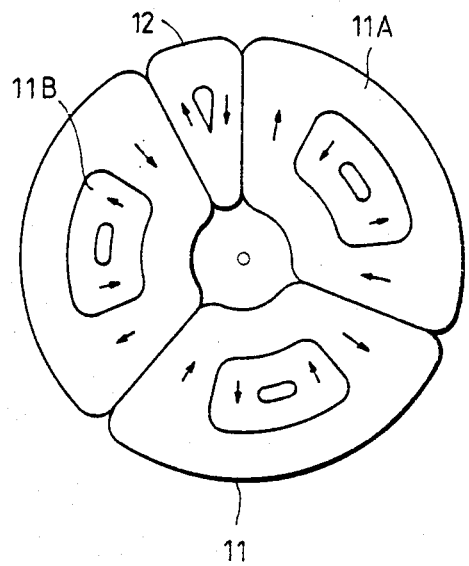
Figure 3:
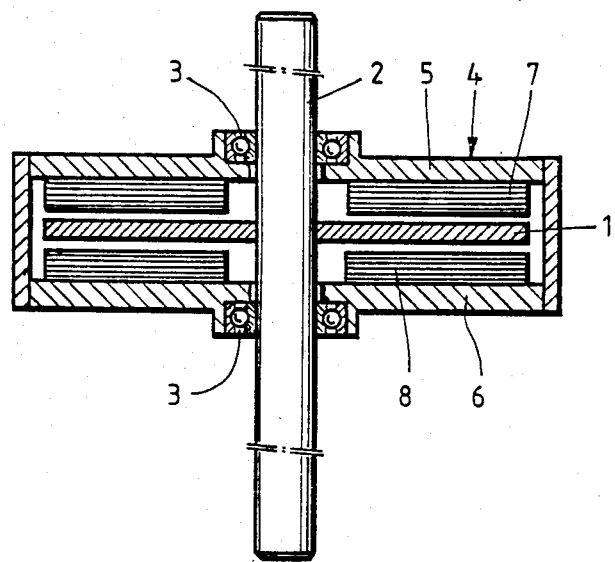
Figure 6:
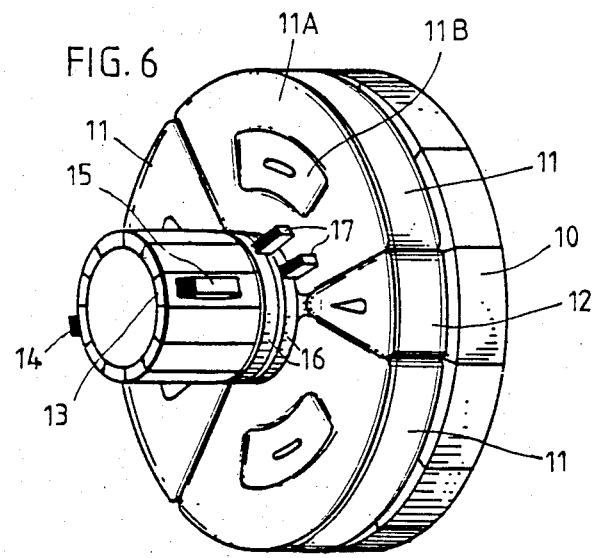
Figure 7:
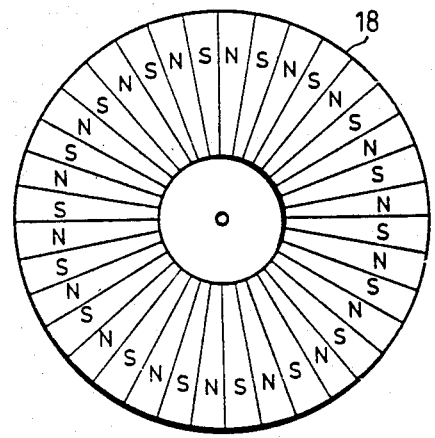
Figure 9:
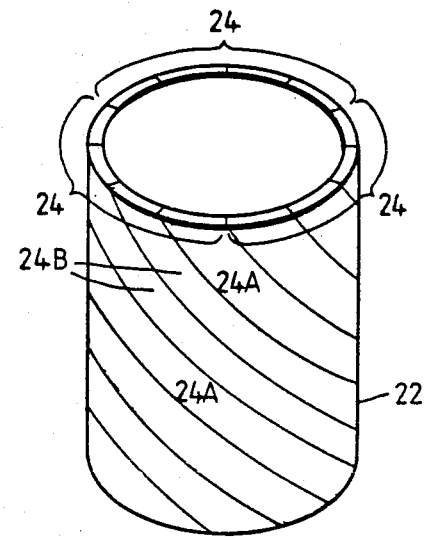
Figure 8:
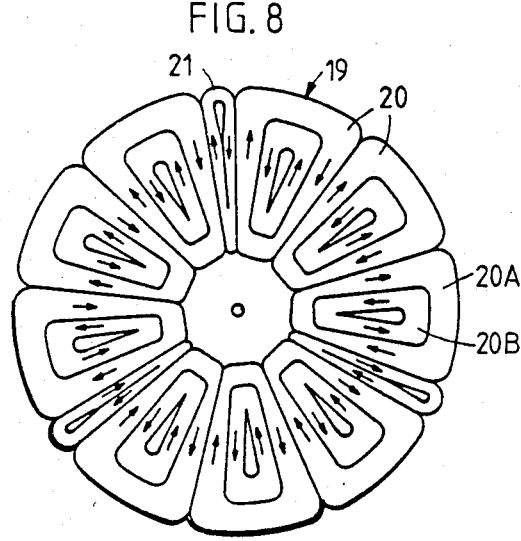
Figure 10:
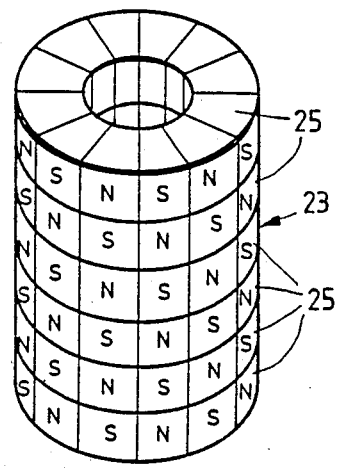

Preferred embodiments of the invention will now be described In detail with reference to the accompanying drawings, in which:

FIGS. 1 and 2 are diagrammatic elevations of the rotor and stator, respectively, of a stepping motor constituting a first embodiment of the invention, FIG. 3 is a diagrammatic axial section through the stepping motor of FIGS. 1 and 2, FIGS. 4 and 5 are diagrammatic elevations of the stator and rotor winding, respectively, of a collector motor constituting a second embodiment of the invention, FIG. 6 is a simplified perspective view of the collector motor of the second embodiment, FIGS. 7 and 8 are diagrammatic elevations of the stator and rotor winding, respectively, of a collector motor similar to that of FIG. 6 representing a third embodiment of the invention, and FIGS. 9 and 10 are simplified diagrammatic perspective views representing rotor and stator elements, respectively, of a synchronous device constituting a fourth embodiment of the invention.

The stepping motor illustrated in FIGS. 1, 2, and 3 comprises a rotor 1 taking the form of a disk of ferromagnetic material magnetized so as to comprise ten pairs of poles, the polarization axes of which are parallel to the axis of the body of rotor 1, distributed about this axis and oriented in alternate directions, as may be seen in FIG. 1. Rotor 1 is mounted on a shaft 2 by means not shown in detail but known per se. Shaft 2 is supported by two bearings 3 relative to a stator cage 4 in which rotor 1 is seated. Cage 4 comprises two cheeks 5 and 6 which may, as need be, take the form of disks of insulating material bearing on their surfaces conductor paths formed by the printed circuit technique. Each of the cheeks 5 and 6 bears a winding 7 or 8, winding 7 being shown in FIG. 2.

Winding 7 is made up of five coils 9, each occupying an angular sector of 70° and grouped into a ring, the diameter of which corresponds to that of rotor 1. Air-core coils 9 may, for example, be cemented to the cheeks bearing them, and their ends will be connected to the feed circuit of the stator. As may be seen in FIG. 2, each coil 9 consists of two different parts 9A and 9B. Part 9B is made up of a number of turns of the winding constituting coil 9, these turns being disposed inside the winding, whereas part 9A is made up of the outer turns. The two parts of coil 9 will preferably be assemblies of flat turns. Each coil part 9A or 9B comprises two straight active winding segments disposed radially, interconnected by portions of turns disposed circumferentially. In order to distinguish between the two parts of each coil, the procedure may be as follows: when the coil is formed, the wire intended to form part 9B, i.e., the inner part of the coil, will be wound first; then, when the necessary number of turns has been wound, the coil-winder will be stopped and restarted in the opposite direction. In this way, the beginning and end of each coil part will be accessible, and the two parts of each coil can be connected independently of the circuit feeding pulses to the motor.

In all the embodiments to be described below, the two parts of each coil will, in fact, be connected so that the current wwill flow through them simultaneously but in opposite directions, as shown by the arrows in FIG. 2. This means that the current will run through two adjacent active winding segments in opposite directions, so that when the current varies, e.g., at the moment a pulse is transmitted or interrupted, the mutual inductance of each coil part upon the other will act in the opposite direction from the self-inductance of the other part.

In the embodiment shown in FIGS. 1 and 2, each active winding segment occupies a sector of the circle formed by the assembly of coils 9 equal to 1/20 of the total since each of the five coils is divided into four active winding segments, and the space occupied by each segment is equal to the space occupied by a pole of the magnet ring 1. Thus, each active winding segment and each pole of the magnet ring 1 correspond to an angle of 180 electrical degrees.

In order for the motor described to operate as a stepping motor, it will suffice for coil ring 8, which is, moreover, made up in exactly the same way as coil ring 9, to be shifted angularly relative to the latter by an angle of 90 electrical degrees, i.e., by an angle corresponding to half the width of an active winding segment. Under these conditions, the rotor will advance by a step equal to 90 electrical degrees with each pulse, the pulses being distributed alternately on coils 9 and coils 8. The motor torque will be due to the interaction between the current circulating in the different active winding segments of the coil layer excited and the magnetic fields of the magnets, and it will be understood that the motor described may operate just as well as a synchronous motor if the duration and frequency of the pulses correspond to the time necessary at each pulse for the rotor to rotate by 90 electrical degrees. Owing to the arrangements of coils 8 and 9 as shown in FIG. 2, a given motor can reach a speed of rotation or a frequency of stepping movements which is higher than what would be obtained under the same conditions with the prior art windings.

The embodiment shown in FIGS. 4, 5, and 6 illustrates the application of the invention to a collector motor in which the stator consists of a ring of magnets 10, and the rotor comprises an assembly of air-core coils made up of three coils 11, each occupying 4/13 of the total arrangement of the winding, and an auxiliary coil 12 occupying 1/13 of that space. As for stator 10, it comprises in this embodiment six pairs of magnets distributed in a cylindrical ring, having their axes of polarization parallel to the axis of the cylinder as in the first embodiment, the direction of the polarization axes being reversed from one magnet to the next. The different coils 11 are connected to the bars 13 of a commutator which is integral with the rotor and which co-operates with two fixed brushes 14 and 15 connected to the current supply. In addition, two rings 16 are each connected to one end of the winding of coil 12 and cooperate with auxiliary brushes 17. It will further be noted that each coil 11 is made up like coils 8 and 9 of two parts 11A and 11B, part 11B being formed by the inner turns of the coil, while part 11A is formed by the outer turns. The number of turns in each part will be determined so that each active winding segment occupies an angular sector having an aperture of about 1/13 of the complete arc of the rotor. Moreover, whereas the stepping motor of FIGS. 1–3 operated as a two-phase motor, the DC collector motor of FIGS. 4, 5, and 6 operates as a three-phase motor, each of the coils 11 being fed successively by the connection of brushes 14 and 15 to the proper bars 13 so that the required number of changeovers per revolution is obtained. The two parts 11A and 11B of each coil 11 will be fed at the same time by currents circulating in the opposite direction at the rate of 36 commutations per revolution.

When the device of FIGS. 4–6 is used as a DC motor, winding 12 can serve as a rotation-signal generator either for counting the number of revolutions of the motor or for detecting its speed of rotation; for when the winding passes in front of the alternate poles of magnet ring 10, an induced voltage varying sinusoidally will be caused to appear in that winding if the speed of rotation is constant. This sinusoidal voltage can be picked up at brushes 17.

FIGS. 7 and 8 are views, analogous to FIGS. 4 and 5, showing a modification of the motor of FIG. 6. In this case, the stator comprises 18 pairs of magnets, the polar axes of which are parallel to the axis of the cylinder and oriented in alternate directions. In front of these 18 pairs of poles, rotor 19 comprises an assembly formed of nine coils 20 and three generator windings 21, each inserted between two successive groups of three coils 20. In the same way, each coil 20 is formed of an outer part 20A surrounding an inner part 20B according to the arrangement of coils 8, 9, and 11. Windings 21 will be connected in series and to rings analogous to rings 16, whereas coils 20 will be connected as three separate windings, each comprising three coils 20. The two parts of each of the coils will be switched on and off at the same time, and the contact between the windings and the commutator bars will take place in such a way that three phases are excited in succession. The first phase may consist of the three coils 20 adjacent, in the same direction of rotation, to the coils 21, the second phase consisting of the coils 20 which are not adjacent to the coils 21, while the third consists of the coils 20 which are adjacent to the coils 21 in the other direction of rotation. The collector (not shown) is designed to effect 108 changeovers per revolution.

In this case, too, the connection of parts 20A and 20B of the coils so that currents running in opposite directions pass through adjacent active winding segments will remedy the effects of self-inductance of the coils, the effects of mutual inductance compensating at least partially for the effects of self-inductance.

Until now, the electromechanical transducers described have been ones in which the axes of magnetization of the magnets were parallel to the axis of the rotor, and the general shape of the coils was that of a sector of a circle, each coil assembly constituting one or more plane layers parallel to the plate of the magnet assembly. However, the coaxial arrangement of coil parts in which the effects of mutual inductance compensate for those of self-inductance is likewise applicable to electromechanical transducers in which the axes of polarization of the magnets are radial axes, and the windings of the coils extend along cylindrical surface portions. This is what is shown diagrammatically in FIGS. 9 and 10, where the body 22 (FIG. 9) schematically represents the rotor winding of a synchronous motor, and the body 23 represents a stator assembly formed of permanent magnets. Body 22 comprises three coils 24 divided into two parts, enclosed one within the other. FIG. 9 shows the active winding segments 24A of the outer part of one of the coils 24 and the active winding segments 24B of the inner part of the same coil 24. The heads of these coils are not shown in the drawing, but it will be realized that they may be disposed and connected in a similar way as described above. As may be seen in FIG. 9, active winding segments 24A and 24B are disposed along lines spiralling on a cylindrical surface which, in the embodiment illustrated, surrounds stator unit 23. When these winding segments curve helically, as in FIG. 9, it is obviously necessary for the magnetic poles of magnet unit 23 to describe spiral lines as well. This may be achieved as shown in FIG. 10, by taking a series of magnet rings 25, each formed, for instance, of twelve magnets whose axes of polarization are disposed radially in alternate directions. The homologous poles are offset from one ring 25 to the next in order to produce spiralling lines of poles of the same designation.

It will be understood that in an embodiment such as the one just described, where the axes of polarization of the magnets are radial in an assembly of magnets forming a cylindrical body, the active winding segments of the coils might be positioned along the generatrices of the cylinder instead. In that case, they would be in straight lines.

If need be, the coil arrangement described might also be used in other types of electromechanical transducers, e.g., in linear motors or pick-ups.

In general, when coils are formed in two parts according to the examples given above, if the active winding segments of the two parts are of the same width, and if the two parts are coaxial and coplanar, the lengths of the wires of the two parts are different. In order to avoid the effects of such a difference, however, wires of different diameters may be used in the two parts of each coil, or other winding arrangements may be adopted.

What is claimed is:

1. An electromechanical transducer of the type having two parts, one fixed and the other rotatable about an axis constituting the axis of the transducer, wherein the improvement comprises:
   magnet means included in one of said parts and arranged for providing in a space adjacent said one part a permanent, non-uniform magnetic field; and
   an assembly of coils included in the other of said parts, said coils being distributed about said axis, in said space, and comprising windings having active winding segments intersected by said magnetic field upon a rotation of said transducer and connecting winding segments not intersected by said magnetic field;
   each of said coils comprising two portions, each of said portions comprising two said active winding segments and two said connecting winding segments and both said portions of each of said coils being connected to one another and arranged in such a way that the effects of the mutual inductance provided by each portion onto the other upon a variation of the current in said coils are opposite to the effects, upon said current variation, of the self-inductance in each of said portions.

2. The transducer of claim 1, wherein said two portions of each of said coils are coaxial, the four active winding segments of each of said coils being disposed side by side and subtending equal angles at said axis.

3. The transducer of claim 2, wherein said magnet means comprises a number of magnets which is four times the number of said coils, the space occupied by each of said magnets corresponding to the space occupied by each of said active winding segments.

4. The transducer of claim 1, wherein said coils are air-core coils.

5. The transducer of claim 2, wherein said coils are air-core coils.

6. The transducer of claim 1, wherein said magnet means comprises one or more magnets, and further wherein the polar axes of said one or more magnets are parallel to the axis of said transducer, said coils being distributed in one or more layers in one or more respective planes perpendicular to said axis.

7. The transducer of claim 6, comprising two said layers of said coils offset angularly relative to one another by the width of one of said active winding segments, wherein said assembly of coils constitutes said fixed part and said one or more magnets constitutes said rotatable part of said transducer, said transducer operating as a stepping motor or synchronous motor.

8. The transducer of claim 6, wherein said one or more magnets are included in said fixed part and said assembly of coils is included in said rotatable part of said transducer, said assembly of coils including a layer of said coils wherein adjacent coils are fed by dephased pulses and each occupy a sector having an angle of aperture smaller than the angle occupied by four adjacent magnets, said transducer operating as a collector motor or synchronous motor.

9. The transducer of claim 8, wherein said rotatable part further comprises at least one auxiliary winding capable of operating as a signal generator.

10. The transducer of claim 1, wherein said magnet means comprises a plurality of magnets forming a cylindrical assembly wherein the polar axes of said magnets are oriented radially, said coils being distributed on a cylindrical surface coaxial with said cylindrical assembly.

11. The transducer of claim 10, wherein said active winding segments of said coils are straight and are positioned along generatrices of said cylindrical surface.

12. The transducer of claim 10, wherein said active winding segments of said coils are oriented along spiralling lines.

* * * * *